3,772,206
RADIOTHERMOLUMINESCENCE DOSIMETERS
AND MATERIALS THEREFOR
Teiichi Hitomi, Chigasaki, and Satoru Nishikawa and Hitoshi Sakamoto, Hiratsuka, Japan, assignors to Dai Nippon Toryo Kabushiki Kaisha, Osaki-shi, Japan
Filed Dec. 30, 1971, Ser. No. 213,950
Claims priority, application Japan, Dec. 31, 1970, 46/123,314
Int. Cl. C09k 1/66; G01t 1/11
U.S. Cl. 252—301.4 R
14 Claims

ABSTRACT OF THE DISCLOSURE

A thermoluminescent material which comprises a complex oxide host crystal of magnesium oxide-boron oxide and terbium and/or dysprosium as an activator element incorporated therein shows strong thermoluminescence after exposure to ionizing radiations and thus is useful as a luminescent materials for radiothermoluminescence dosimeters.

BACKGROUND OF THE INVENTION

Field of the invention

The present invention relates to radiothermoluminescence dosimeters adapted for use in measurement of exposure dose of ionizing radiations and materials therefor.

DESCRIPTION OF THE PRIOR ART

In recent years, radiothermoluminescence dosimeters utilizing thermoluminescence of luminescent materials have attracted attention and been utilized particularly in the fields of health physics, radiology, etc. because of the advantages thereof such as simple operation, compactness, availability in various forms such as powder, tablet, etc., and their ability for precise measurement of cumulative dosages over a wide range of various ionizing radiations.

Radiothermoluminescence dosimeters are provided with an ability to accumulate the energy absorbed therein over a long period of time when exposed to ionizing radiations such as X-rays, and to emit said accumulated energy as visible or near-visible light when said dosimeters acquire thermal energy for example by heating. The phenomenon of emmitting luminescence by means of heating is called thermoluminescence. Thus, quantitative determination of exposure dosages can be realized by measuring the light sum or light intensity of the thermoluminescence because it is proportional to the stored energy in the luminescent materials after exposure to ionizing radiation.

Although the mechanism of thermoluminescence is specific to each luminescent material and looks complicated in its aspects, it may be qualitatively explained as follows: In radiothermoluminescent materials, impurity elements or crystalline lattice defects present in the host crystal form metastable states of energy, into which electrons or positive holes excited from the ground state by means of ionizing radiation are captured. Then, when the luminescent materials in such a state are heated to a sufficiently high temperature, electrons or positive holes captured in the metastable states are again activated and released, and brought back to the ground state, emitting luminescence in the visible or near-visible wave length range.

The conventional thermoluminescent materials employed in the dosimetry of ionizing radiations are exemplified by LiF, $Li_2B_4O_7$:Mn, $CaSO_4$:Dy, $CaF_2$:Mn, etc.

LiF and $Li_2B_4O_7$:Mn are associated with various disadvantages such as low sensitivity and complicated heat treatments but have the advantage of effective atomic number nearer to the soft tissue of the human body. On the other hand $CaSO_4$:Dy and $CaF_2$:Mn have the disadvantage of higher effective atomic number but are provided with the advantages of higher sensitivity and easiness of measurement over a wide range. Thus, luminescent materials generally have both advantages and disadvantages.

The present inventors have made many studies on development and improvement of various materials to obtain a luminescent material having only advantages free from disadvantages.

SUMMARY OF THE INVENTION

The present invention provides radiothermoluminescence dosimeters and materials therefor, which comprise a host material composed of light elements, having high sensitivity to radiation dosages.

It has been found that a luminescent material comprising a complex oxide of magnesium oxide and boron oxide and a trace amount of terbium and/or dysprosium as an activator element incorporated therein shows a strong thermoluminescence after exposure to ionizing radiation and are useful as a material for radiothermoluminescence dosimeters having high sensitivity.

The materials for the radiothermoluminescence dosimeters according to the present invention may be expressed by the general formula:

$$MgO \cdot xB_2O_3 : yA$$

wherein A stands for an effective activator element, namely at least one of terbium and dysprosium; $x$ stands for the number of moles of boron trioxide present per 1 mole of magnesium oxide in the starting materials; and $y$ represents the number of gram-atoms of activator element A present per 1 mole of magnesium oxide in the starting materials. Although $x$ may be within the range of 0.2 to 5.0 and $y$ within the range of $10^{-5}$ to $5 \times 10^{-2}$, the best results may be obtained when $x$ is within the range of 1.0 to 3.0 and $y$ the range of $5 \times 10^{-3}$ to $3 \times 10^{-2}$.

DESCRIPTION OF THE PREFERRED EMBODIMENTS

The material used for a radiothermoluminescence dosimeter according to the present invention may be prepared by, using as sources for the host material of the thermoluminescent material, magnesium oxide or a magnesium compound easily convertible to said oxide upon heating such as magnesium carbonate, magnesium hydroxide, etc. and boron oxide or a boron compound easily convertible to said oxide upon heating, adding to said sources of host material at least one member selected from the group consisting of terbium oxide, a terbium compound easily convertible to said oxide upon heating, dysprosium oxide and a dysprosium compound easily convertible to said oxide upon heating as an activator source sufficiently mixing these ingredients, and heating the thus obtained mixture in an atmosphere of air in a high temperature electric furnace followed by quenching and crushing, if necessary. The mixing may be carried out either by a dry process on a ball mill or mixer mill or by slurrying the ingredients to slurry with water, alcohol, etc. Also, approximately the same result is obtained by employing the wet process in which each ingredient is coprecipitated, for example in the form of their hydroxides.

The heating temperature is generally within the range of 500° to 1200° C. The heating time is generally within the range of 0.5 to 10 hours, depending on the capacity of the crucible used, charging amount in the crucible, etc. Particularly desirable results are obtained by effecting the heating within the temperature range of 800° to 1000° C. for 1 to 5 hours. It is also possible to reheat the obtained material in an inert gas atmosphere such as argon or nitrogen in order to enhance the thermoluminescence intensity. It is preferred to sufficiently wash the luminescent material with for example hot water after the completion of heating.

Figure 2:
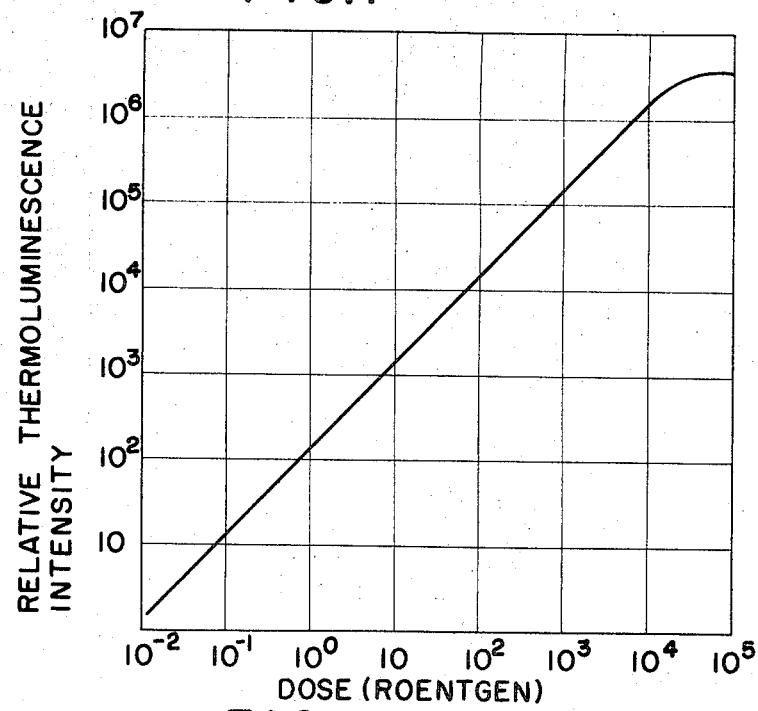
FIG. 2 is a graph showing the relationship between the dose of exposure and the thermoluminescence intensity after exposure to $^{60}$Co γ-rays of a radiothermoluminescence dosimeter composed of a material of dysprosium-activated magnesium-boron oxide as an example of materials for radiothermoluminescence dosimeter according to the present invention.

When a dosimeter composed of the thus obtained thermoluminescent material, $MgO \cdot xB_2O_3:yA$ is used to determine the dose of exposure of X-rays or $\gamma$-rays, it allows quantitative measurement of the dose comprised between minute dosages of several mR, and high dosages up to $3 \times 10^4$ R. In FIG. 2 the relationship between the exposure dose and the thermoluminescence intensity after exposure of $^{60}Co$ $\gamma$-rays is shown with respect to the material $MgO \cdot 2B_2O_3:0.02Dy$ as an example of a luminescent material according to the present invention. With reference to the luminescent material activated with terbium, approximately the same result is obtained. Furthermore, it is pointed out that the luminescent material according to the present invention qualitatively permits the dosimetry from the lower limit of several hundreds $\mu R$ to the upper limit of $10^5$ R and thus can be suitably utilized in radiothermoluminescence dosimeters for determining the cumulative dosages of various ionizing radiation such as X-rays, $\gamma$-rays, etc.

Although thermoluminescent materials having a glow peak at the range of 150° to 200° C. are also obtained by employing thullium, europium, manganese or thallium instead of terbium or dysprosium as the activator, said materials are lower in their thermoluminescence intensity as compared with terbium- or dysprosium-activated luminescent materials and often sub-peaks accompany the main peak, and therefore these other materials are inferior luminescent material for radiothermoluminescence dosimeters.

The radiothermoluminescence dosimeters according to the present invention are composed of the above-mentioned materials which may be expressed by the general formula: $MgO \cdot xB_2O_3:yA$ wherein A, x and y are defined respectively as in the above description.

The materials are made into radiothermoluminescence dosimeters by means of sealing said materials in a glass tube together with an inert gas, or of solidifying said material, for example by sintering said material, by compressing said material with a small amount of a tabletting agent such as potassium bromide to form a tablet or by embedding said material in a thermoresistant resin such as a fluorine resin or a silicone resin. For the purpose of making the radiothermoluminescence dosimeter, any other means or method for forming thermoluminescence dosimeters is naturally applicable, so long as the radiothermoluminescent material according to the present invention constitutes the essential component of the radiothermoluminescence dosimeter.

The present invention will be further illustrated by the following examples. The most recommendable compositions and preparation methods of thermoluminescent materials are shown in Examples 4 and 7.

EXAMPLE 1

The following materials:

| | Mole |
|---|---|
| Magnesium oxide, MgO | 1 |
| Boron trioxide, $B_2O_3$ | 1 |
| Terbium oxide, $Tb_2O_3$ | 0.0025 | were mixed sufficiently in a ball mill or mixer mill, charged into an alumina or quartz crucible and then heated at 950° C. for 2 hours in a high temperature electric furnace under an air atmosphere followed by sufficiently washing with hot water.

Figure 1:
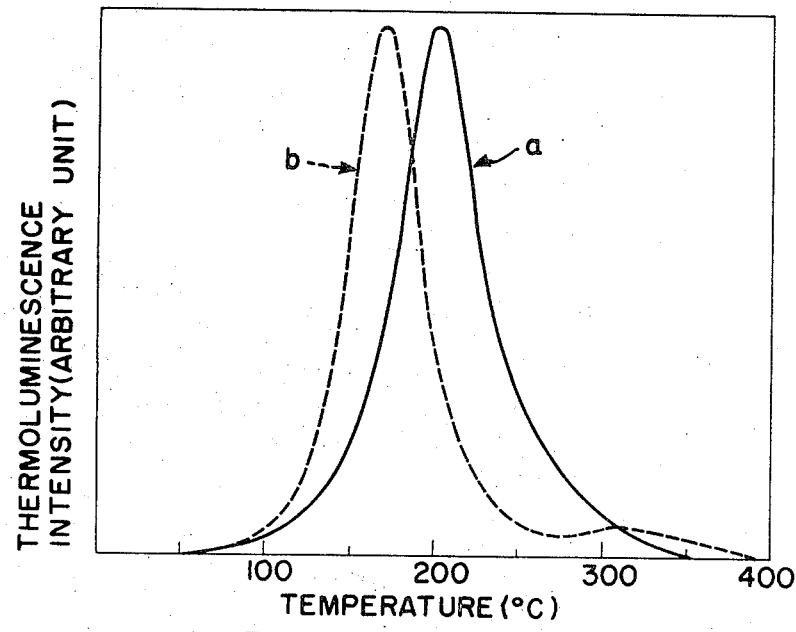
FIG. 1(a) is a graph showing the relationship between the heating temperature and the intensity of thermoluminescence after exposing, to X-rays a radiothermoluminescence dosimeter composed of a material of terbium-activated magnesium-boron oxide as an example of materials for radiothermoluminescence dosimeter according to the present invention.
FIG. 1(b) is a graph showing the relationship between the heating temperature and the thermoluminescence intensity after exposure to X-rays of a radiothermoluminescence dosimeter composed of a material of dysprosium-activated magnesium-boron oxide as an example of materials for radiothermoluminescence dosimeter according to the present invention.

The radiothermoluminescence dosimeter made from 30 milligrams of the thus obtained material, by means of sealing the material in a 12 mm. x 2 mm. $\phi$ glass tube together with pure argon, when exposed to the various ionizing radiations such as X-rays or $\gamma$-rays and thereafter brought to the elevated temperature by heating shows thermoluminescence with a peak at ca. 200° C. The glow curve is shown in FIG. 1(a).

EXAMPLE 2

The following materials:

| | Moles |
|---|---|
| Magnesium sulfate, $MgSO_4$ | 1 |
| Boron oxide, $B_2O_3$ | 2 |
| Dysprosium oxide, $Dy_2O_3$ | 0.01 | were mixed sufficiently in a ball mill or mixer mill, charged into an alumina or quartz crucible and then heated at 980° C. for 3 hours in a high temperature electric furnace under an air atmosphere followed by sufficiently washing with hot water.

The radiothermoluminescence dosimeter made from the thus obtained material, in the same manner as in Example 1, when exposed to the various ionizing radiations such as X-rays or $\gamma$-rays and thereafter brought to the elevated temperature by heating, shows thermoluminescence with a peak at ca. 180° C. The glow curve is shown in FIG. 1(b).

EXAMPLE 3

The following materials:

| | Moles |
|---|---|
| Magnesium sulfate, $MgSO_4$ | 1 |
| Orthoboric acid, $H_3BO_3$ | 4 |
| Terbium oxide, $Tb_2O_3$ | 0.005 | were mixed sufficiently in a ball mill or mixer mill, charged into an alumina or quartz crucible and then heated at 900° C. for 3 hours in a high temperature electric furnace under air atmosphere followed by washing sufficiently with hot water.

The radiothermoluminescence dosimeter made from the thus obtained material, in the same manner as in Example 1, when exposed to the various ionizing radiations such as X-rays or $\gamma$-rays and thereafter brought to the elevated temperature by heating, shows thermoluminescence with a peak at ca. 200° C.

EXAMPLE 4

The following materials:

| | Moles |
|---|---|
| Magnesium sulfate, $MgSO_4$ | 1 |
| Boron oxide, $B_2O_3$ | 2 |
| Dysprosium nitrate, $Dy(NO_3)_3 \cdot 6H_2O$ | 0.01 | were mixed sufficiently in a ball mill or mixer mill, charged into an alumina or quartz crucible and then heated at 950° C. for 3 hours in a high temperature electric furnace under air atmosphere followed by washing sufficiently with hot water.

The radiothermoluminescence dosimeter made from the thus obtained material, in the same manner as in Example 1, when exposed to the various ionizing radiations such as X-rays or γ-rays and thereafter brought to the elevated temperature by heating, shows thermoluminescence with a peak at ca. 180° C.

EXAMPLE 5

| | Moles |
|---|---|
| Magnesium carbonate, $MgCO_3$ | 1 |
| Boron oxide, $B_2O_3$ | 2 |
| Terbium nitrate, $Tb(NO_3)_3 \cdot 6H_2O$ | 0.01 |

The above starting materials were made in to a slurry by adding about 200 ml. of ethyl alcohol thereto and mixing sufficiently while stirring. The mixture thus obtained was charged into an alumina or quartz crucible after drying and crushing, and then heated at 900° C. for 3 hours in a high temperature electric furnace under an air atmosphere followed by washing sufficiently with hot water.

The radiothermoluminescence dosimeter made from the thus obtained material, in the same manner as in Example 1, when exposed to the various ionizing radiations such as X-rays or γ-rays and thereafter brought to the elevated temperature by heating, shows thermoluminescence with a peak at ca. 200° C.

EXAMPLE 6

The following materials:

| | Moles |
|---|---|
| Magnesium carbonate, $MgCO_3$ | 1 |
| Orthoboric acid, $H_3BO_3$ | 3 |
| Dysprosium oxide, $Dy_2O_3$ | 0.01 | were mixed sufficiently in a ball mill or mixer mill charged into an aumina or quartz crucible and then heated at 950° C. for 5 hours in a high temperature electric furnace under an air atmosphere followed by washing sufficiently with hot water.

The radiothermoluminescence dosimeter made from the thus obtained material, in the same manner as in Example 1, when exposed to the various ionizing radiations such as X-rays or γ-rays and thereafter brought to the elevated temperature by heating, shows thermoluminescene with a peak at ca. 180° C.

EXAMPLE 7

| | Moles |
|---|---|
| Magnesium oxide, MgO | 1 |
| Boron oxide, $B_2O_3$ | 2 |
| Terbium oxide, $Tb_2O_3$ | 0.01 |

A nitric acid solution of the above mentioned terbium oxide was added to a mixture of the above mentioned magnesium oxide and boron oxide which was sufficiently mixed in a ball mill or mixer mill, charged into an alumina or quartz crucible, and then heated at 850° C. for 2 hours in a high temperature electric furnace under an air atmosphere followed by sufficiently washing with hot water.

The radiothermoluminescence dosimeter made from the thus obtained material, in the same manner as in Example 1, when exposed to the various ionizing radiations such as X-rays or γ-rays and thereafter brought to the elevated temperature by heating, shows thermoluminescence with a peak at ca. 200° C.

EXAMPLE 8

The following materials:

| | Moles |
|---|---|
| Magnesium chloride, $MgCl_2 \cdot 6H_2O$ | 1 |
| Orthoboric acid, $H_3BO_3$ | 6 |
| Terbium chloride, $TbCl_3 \cdot 7H_2O$ | 0.01 |
| Dysprosium chloride, $DyCl_3 \cdot 7H_2O$ | 0.005 | were mixed sufficiently in a ball mill or mixer mill, charged into an alumina or quartz crucible and then heated at 850° C. for 4 hours in a high temperature electric furnace under an air atmosphere followed by sufficiently washing with hot water.

The radiothermoluminescence dosimeter made from the thus obtained material, in the same manner as in Example 1, when exposed to the various radiations such as X-rays or γ-rays and thereafter brought to the elevated temperature by heating, shows thermoluminescence with a peak at ca. 200° C.

What is claimed is:

1. A radiothermoluminescence dosimeter composed of a radiothermoluminescent material which consists of a complex oxide host crystal of magnesium oxide-boron oxide having incorporated therein at least one activator element chosen from the group consisting of terbium and dysprosium said radiothermoluminescent material being represented by the formula:

$$MgO \cdot xB_2O_3 \cdot yA$$

wherein $x$ varies from 0.2 to 5.0, $y$ varies from $10^{-5}$ to $5 \times 10^{-2}$ and A represents said activator element.

2. The radiothermoluminescence dosimeter according to claim 1 wherein $x$ varies from 1.0 to 3.0 and wherein $y$ varies from $5 \times 10^{-3}$ to $3 \times 10^{-2}$.

3. The radiothermoluminescence dosimeter according to claim 1 wherein $x$ is about 2 and wherein $y$ is about $2 \times 10^{-2}$ when the activator element is terbium or wherein $y$ is about $10^{-2}$ when the activator element is dysprosium.

4. A thermoluminescent material which consists of a complex oxide host crystal of magnesium oxide-boron oxide having incorporated therein at least one activator element selected from the group consisting of terbium and dysprosuim said material being represented by the formula:

$$MgO \cdot xB_2O_3 \cdot yA$$

wherein $x$ varies from 0.2 to 5.0, $y$ varies from $10^{-5}$ to $5 \times 10^{-2}$ and A represents said activator element.

5. The thermoluminescent materail according to claim 4 wherein $x$ varies from 1.0 to 3.0 and wherein $y$ varies from $5 \times 10^{-3}$ to $3 \times 10^{-2}$.

6. The thermoluminescent material according to claim 4 wherein $x$ is about 2 and wherein $y$ is about $2 \times 10^{-2}$ when the activator element is terbium or wherein $y$ is about $10^{-2}$ when the activator element is dysprosium.

7. A process for producing a thermoluminescent material which comprises mixing (1) magnesium oxide or a magnesium compound which forms magnesium oxide upon heating, (2) boron trioxide in an amount of 0.2 to 5.0 moles with respect to one mole of said magnesium oxide or an amount of a boron compound which forms boron trioxide upon heating to provide said amount of boron trioxide and (3) terbium or dysprosium or compounds thereof which form terbium or dysprosium upon heating in an amount of $10^{-5}$ to $5 \times 10^{-2}$ gram-atoms with respect to 1 mole of said magnesium oxide and heating the resulting mixture at a temperature ranging from 500° to 1200° C. in air for 0.5 to 10 hours to produce a thermoluminescent material represented by the formula:

$$MgO \cdot xB_2O_3 \cdot yA$$

wherein $x$ ranges from 0.2 to 5, wherein $y$ ranges from $10^{-5}$ to $5 \times 10^{-2}$ and wherein A represents said terbium or dysprosium.

8. The process for producing a thermoluminescent material according to claim 7 wherein boron trioxide and terbium or dysprosium in the amounts of 1.0 to 3.0 moles and $5 \times 10^{-3}$ to $3 \times 10^{-2}$ gram-atoms, respectively, with respect to 1 mole of magnesium oxide are mixed with magnesium oxide and the heating is effected at a temperature ranging from 800° to 1000° C. for 1 to 5 hours to produce a thermoluminescent material represented by the formula:

$$MgO \cdot xB_2O_3 \cdot yA$$

wherein $x$ varies from 1.0 to 3.0, wherein $y$ varies from $5 \times 10^{-3}$ to $3 \times 10^{-2}$ and wherein A represents said terbium or dysprosium.

9. The process for producing a thermoluminescent material according to claim 7 wherein about 2 moles of boron trioxide and about $2 \times 10^{-2}$ gram-atoms of terbium or about $10^{-2}$ gram-atoms of dysprosium with respect to 1 mole of magnesium oxide are mixed with magnesium oxide and the heating is effected at a temperature ranging from 800° to 1000° C. for 1 to 5 hours to produce a thermoluminescent material represented by the formula:

$$MgO \cdot xB_2O_3 \cdot yA$$

wherein $x$ is about 2, wherein $y$ is about $2 \times 10^{-2}$ when terbium is present or wherein $y$ is about $10^{-2}$ when dysprosium is present and wherein A represents said terbium or dysprosium.

10. The process for producing a thermoluminescent material according to claim 7 wherein said mixing is a dry mixing process.

11. The process for producing a thermoluminescent material according to claim 7 wherein said mixing is performed by forming a slurry of the ingredients in water or alcohol.

12. The process for producing a thermoluminescent material according to claim 7 wherein following said heating step, the resulting material is washed with hot water.

13. The process for producing a thermoluminescent material according to claim 8 wherein following said heating step, the material is washed with hot water.

14. The process for producing a thermoluminescent material according to claim 9 wherein following said heating step, the resulting material is washed with hot water.

References Cited
UNITED STATES PATENTS

| | | | |
|---|---|---|---|
| 3,014,877 | 12/1961 | Ranby et al. | 252—301.4 R |
| 3,422,325 | 1/1969 | Wanmaker et al. | 252—301.4 R |
| 3,682,833 | 8/1972 | Hitomi et al. | 252—301.4 R |

EDWARD J. MEROS, Primary Examiner

J. COOPER, Assistant Examiner

U.S. Cl. X.R.

250—71 R, 83 CD